(12) United States Patent
Schwiertz

(10) Patent No.: US 9,249,799 B2
(45) Date of Patent: Feb. 2, 2016

(54) CYLINDER HOUSING, IN PARTICULAR PUMP CYLINDER HOUSING

(75) Inventor: Norbert Schwiertz, Strausberg (DE)

(73) Assignee: Berlin Heart GmbH, Berlin (DE)

( * ) Notice: Subject to any disclaimer, the term of this patent is extended or adjusted under 35 U.S.C. 154(b) by 526 days.

(21) Appl. No.: 13/700,065

(22) PCT Filed: May 30, 2011

(86) PCT No.: PCT/EP2011/002762
§ 371 (c)(1),
(2), (4) Date: Nov. 26, 2012

(87) PCT Pub. No.: WO2011/151085
PCT Pub. Date: Dec. 8, 2011

(65) Prior Publication Data
US 2013/0087040 A1    Apr. 11, 2013

Related U.S. Application Data

(60) Provisional application No. 61/349,936, filed on May 31, 2010.

(30) Foreign Application Priority Data

May 31, 2010 (EP) ..................................... 10075233

(51) Int. Cl.
| F04B 53/16 | (2006.01) |
| --- | --- |
| F04B 39/12 | (2006.01) |
| F04B 39/14 | (2006.01) |
| F04B 53/00 | (2006.01) |
| F04B 53/22 | (2006.01) |
| F16J 13/12 | (2006.01) |

(52) U.S. Cl.
CPC ............... *F04B 53/162* (2013.01); *F04B 39/12* (2013.01); *F04B 39/125* (2013.01); *F04B 39/14* (2013.01); *F04B 53/007* (2013.01); *F04B 53/16* (2013.01); *F04B 53/22* (2013.01); *F16J 13/12* (2013.01)

(58) Field of Classification Search
CPC ............. F16J 13/08; F16J 13/12; F16J 15/18; F16J 15/184; F16J 15/187; F16J 15/188; F04B 39/12; F04B 39/125; F04B 39/14; F04B 53/162; F04B 53/16; F04B 53/22; F04B 53/007; F04B 53/164; F04B 53/146; F04B 53/147; F04B 53/168; F04B 53/166
See application file for complete search history.

(56) References Cited

U.S. PATENT DOCUMENTS

| 1,677,848 | A | * | 7/1928 | Pruiett | ........................... 277/511 |
| 1,971,727 | A | | 8/1934 | Parrott | |

(Continued)

FOREIGN PATENT DOCUMENTS

| CN | 101151462 A | 3/2008 |
| CN | 101688527 A | 3/2010 |

(Continued)

*Primary Examiner* — Edward Look
*Assistant Examiner* — Michael Quandt
(74) *Attorney, Agent, or Firm* — Brinks Gilson & Lione

(57) ABSTRACT

A pump cylinder housing has a hollow cylinder and an end-side cover part, a threaded sleeve may be fixed on the outside of the hollow cylinder, at least three radially outward projections are connected to and distributed on the cover part periphery to the cover part and at least partly pass through recesses of the threaded sleeve. A union nut may be screwed onto the threaded sleeve so that the projections project radially out of the threaded sleeve and bear on an end side of the union nut. The cylinder housing may be assembled by in a simple manner so that the cylinder housing and the cover part may be connected to one another in an exactly colinear and centred manner and thereby may be reliably sealed. The cylinder cover may thereby be positioned in an infinite radial position on the cylinder.

13 Claims, 4 Drawing Sheets

(56) References Cited

U.S. PATENT DOCUMENTS 2,712,951 A * 7/1955 Legate .................... 277/512
3,327,643 A * 6/1967 Pangburn ................ 92/171.1
5,073,096 A   12/1991 King et al.

FOREIGN PATENT DOCUMENTS

| | | |
|---|---|---|
| GB | 564070 | 9/1944 |
| GB | 739996 | 11/1955 |
| JP | 2003-056703 A | 2/2003 |

* cited by examiner

CYLINDER HOUSING, IN PARTICULAR PUMP CYLINDER HOUSING

CROSS-REFERENCE TO RELATED APPLICATIONS

This application is a 371 nationalization of PCT/EP2011/002762, which in turn claims benefit of U.S. Provisional Application 61/349,936 filed May 31, 2010, and European application 10075233.6 filed May 31, 2010.

BACKGROUND

The invention lies in the field of mechanics, in particular engineering, and concerns the design of cylinder housings.

Cylinder housings are used in different fields of application such as in hydraulics, pneumatics or with internal combustion engines, for example as working cylinders. For many such applications, it is necessary to close a corresponding cylinder, usually with a circular cross section, by way of a cover part. A corresponding cover part may be integrally connected to the cylinder housing as one piece, but may also be placed onto this and fixed with mechanical holding means. For many applications, furthermore, there is a demand for the cover part to close off the cylinder housing in a gas-tight or liquid-tight manner.

In this context, it is the object of the present invention to provide a cylinder housing which may be closed off in a sealed manner at the end side, wherein a hollow cylinder and the cover part may be connected to one another in a colinear and centred manner and with an infinitely variable radial position, and furthermore the fastening of the cover part should be designed in a simple manner without the reliability of the connection being compromised due to this.

SUMMARY

For achieving the object, the invention envisages an end-side cover part which may be fixed with the aid of a union nut. The union nut may be screwed onto a threaded sleeve which on the outside may be placed onto the hollow cylinder. The threaded sleeve may be fixed on the hollow cylinder and comprises recesses, through each of which one of at least three radial projections distributed on the periphery of the cover part at least partly projects in the radial direction.

The cover part may also comprise at least three axially running continuations which run in recesses of the threaded sleeve and have radially outwardly directed projections which project radially out of the threaded sleeve and bear on an end-side of the union nut. With this, by screwing on the union nut, an axial tension may be exerted in a uniform manner onto the projections and the continuations, so that the cover part is colinearly pressed against the end-side of the hollow cylinder.

The continuations are designed in the manner of stay bolts or bosses, and three or more such continuations may advantageously be uniformly distributed on the periphery of the cover part.

Further advantageously, one may envisage the threaded sleeve being designed as a crown sleeve with radial, in particular rectangular, tapers, advantageously designed as longitudinal grooves which extend from the end which is on the cover part side over a part of the length of the threaded sleeve.

The longitudinal grooves may thereby be designed as recesses which are continuous or non-continuous in the radial direction and in which the continuations may be displaced in the longitudinal direction of the hollow cylinder.

The thread is interrupted in each case on the peripheral side in the region of the longitudinal grooves, but the longitudinal grooves are designed so narrow that despite this, the union nut may be screwed onto the thread.

One may also envisage the longitudinal grooves extending radially through the wall of the threaded sleeve.

One envisages the threaded sleeve being longitudinally slotted in a continuous manner for fixing the threaded sleeve on the hollow cylinder, preferably on its peripheral outer surface. The threaded sleeve may thus be widened radially and may be elastically widened for attachment, so as to lock in at the outside on the hollow cylinder after snapping on.

Since the threaded sleeve must accommodate exclusively tensile forces in the direction to the cover-side end of the hollow cylinder, it is sufficient if corresponding forces are accommodated in one direction, for which for example the snapping of a locking lug behind an undercut is sufficient.

One may envisage the threaded sleeve comprising at least one radially inwardly projecting projection which engages into a recess or undercut on the outer side of the hollow cylinder for fixing the threaded sleeve in the axial direction. Thus a reliable fixation of the threaded sleeve in the longitudinal direction relative to the hollow cylinder is given. The projection may for example be an elastic locking lug.

One may moreover envisage the threaded sleeve comprising several projections which are distributed in an annular manner on its inner peripheral surface and which engage into corresponding recesses or undercuts on the outer side of the hollow cylinder. By way of this, one may ensure a uniform fastening without the danger of a tilting of the threaded sleeve with respect to the longitudinal axis of the hollow cylinder.

A further possible design of the invention envisages the hollow cylinder at its outer peripheral surface comprising at least one projection which cooperates with a recess or undercut on the inner side of the threaded sleeve for its axial fixation. In this case too, several projections and recesses may be distributed uniformly on the periphery.

One may also envisage the hollow cylinder comprising a cone on its end-side, said cone cooperating with the cover part, for a particularly simple and, where required, sealed joining of the hollow cylinder with the cover part.

The cone may for example serve for centring the cover part with respect to the hollow cylinder, but also for sealing.

Such a cone may for example be provided on the inner peripheral surface of the hollow cylinder as a conically tapering surface, but also as a surface on the outer side of the hollow cylinder, said surface tapering conically to the cover-side end.

In order to improve the sealing of the cover part on the hollow cylinder, one advantageous design of the invention envisages the cone of the hollow cylinder cooperating with the cover part by an intermediate sealing ring layer. Such a sealing ring may advantageously for example consist of an elastomer, in particular rubber.

The invention may also relate to a cylinder housing which comprises a hollow cylinder and in each case a cover part on both sides on its end-sides. With this, both sides of the hollow cylinder may be closed in a simple manner and the cover parts may be positioned radially to one another in an infinite manner.

When using the cylinder housing for a piston pump, one may for example envisage a cover part comprising a drive lead-through for a drive rod of a pump piston. The cover part in the radially outer region is then designed just as a continuous cover part, but in the central region comprises a push lead-through, at which for example a cylindrical rod which in the inner region of the hollow cylinder carries a piston, is led through in a gas-tight sealed manner.

When used as a pump piston, this piston seals on the inner peripheral surface of the hollow cylinder.

For example, the housing may serve as a pump housing for a piston pump which periodically compresses and expands a gas, for example air, in order to communicate these pressure fluctuations via a pressure conduit to a membrane pump which utilises the pressure fluctuations in a working space for suctioning and expelling blood or other body fluids. The invention also relates to such a pump system with a piston pump.

Accordingly, the design of the cylinder housing, according to the invention, is simple to assemble, is stable and is reliably gas-tight and may also be applied under medical application conditions.

The invention is hereinafter shown by way of an embodiment example in a drawing and subsequently described.

BRIEF DESCRIPTION OF THE DRAWINGS

Thereby, there are shown in

FIG. 7 the embodiment of FIG. 6 in an assembled representation, and in

DESCRIPTION OF A PREFERRED EMBODIMENT

Figure 1:
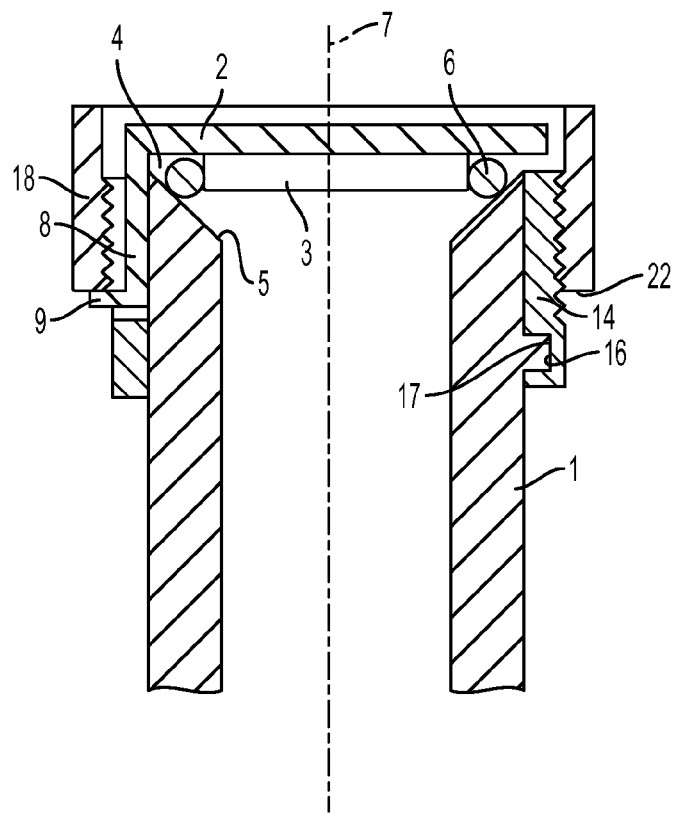
FIG. 1 schematically, a longitudinal section of a part of a cylinder housing.

FIG. 1 shows a part of a pump cylinder housing with a hollow cylinder 1 and with a cover part 2, which is placed onto the hollow cylinder 1 at the end side. The cover part 2 is represented in a plan view, in which an inwardly projecting centric cylindrical lug 3 can be recognised.

An annular elastomer seal 6, for example of rubber or silicone elastomer, is provided in a corner 4 between the cover part 2, the cylindrical lug 3 and an inner cone 5 of the hollow cylinder 1, and this seal on the one hand centres the cover part 2 with respect to the hollow cylinder and one the other hand ensures a gas-tight closure of the cylinder housing.

The cover part 2 is connected by way of several continuations which are distributed on its periphery, run in the direction of the symmetry axis 7 of the hollow cylinder and of which three are uniformly distributed on the periphery of the cover part. Of these, one, the continuation 8, is represented in FIG. 1. This, at its end which is away from the cover part 2, has a radially outwardly facing projecting 9.

Figure 2:
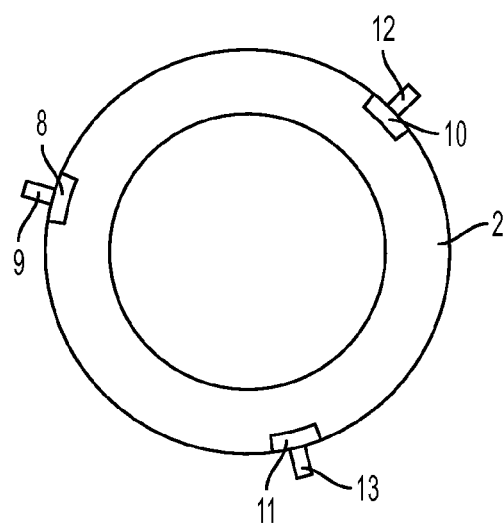
FIG. 2 a plan view of a cover part

FIG. 2 in a plan view shows the cover part 2 with the three continuations 8, 10, 11 and with corresponding projections 9, 12, 13 which in each case point radially outwards.

Figure 3:
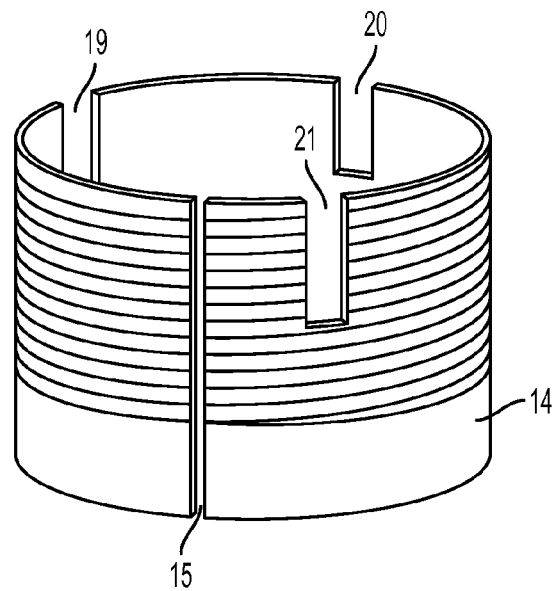
FIG. 3 a three-dimensional view of a threaded sleeve.

The cover part 2 is connected to the hollow cylinder by way of a threaded sleeve 14 which is represented in FIG. 3 in more detail. The threaded sleeve 14 comprises a continuous longitudinal slot 15, by which means it may be elastically widened. The sleeve may be snapped on the outside onto the hollow cylinder 1 in a manner such that a recess 16 represented in FIG. 1 and which is on the inner peripheral surface of the sleeve, may be snapped on over a corresponding projection 17 on the outer peripheral surface of the hollow cylinder 1. By way of this, the threaded sleeve is fixed on the hollow cylinder 1 in the axial direction. Advantageously, several, in particular three such positive-fit connections, formed in each case of a projection and a recess, may be distributed on the periphery of the hollow cylinder.

A union nut 18 may be screwed onto the threaded sleeve 14.

On placing the cover part 2 onto the hollow cylinder 1, the continuations 8, 10, 11 are inserted into corresponding recesses 19, 20, 21 running in the axial direction 7 of the hollow cylinder 7, said recesses belonging to the threaded sleeve which is thus designed as a crown sleeve. The recesses may be designed in a radially continuous manner, which means they completely pass through the sleeve, or may also only be designed as radially outwardly arranged, non-continuous grooves.

The continuations 8, 10 11, are dimensioned such that they do not project radially out of the contours of the threaded sleeve 14, so that the union nut may be screwed on over them.

The end-side 22 of the union nut 18 bears on the projections 9, 12, 13 and presses these in the axial direction 7 of the hollow cylinder in a manner such that the cover part 2 fastened by way of the continuations is pressed against the end-side of the hollow cylinder. A uniform pressure is exerted onto the cover part by way of a uniform distribution of the continuations 8, 10, 11 on the periphery of the cover part. Thus a permanent sealing of the connection between the cover part and the hollow cylinder may be ensured, and moreover forces acting on the cover part may be accommodated.

Usually, the hollow cylinder as well as the cover part, the threaded sleeve and the union nut consist of a metallic material. The individual parts may however consist completely or partly of a plastic.

Figure 4:
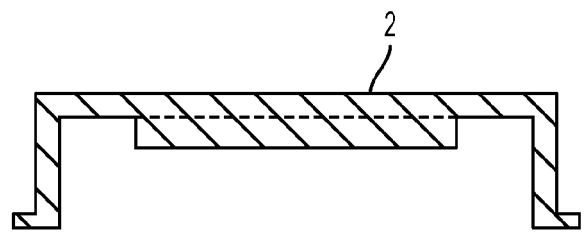
FIG. 4 a longitudinal section of a cover part.

FIG. 4 schematically shows a longitudinal section through a cover part which for example has four continuations which are distributed symmetrically on the periphery.

Figure 5:
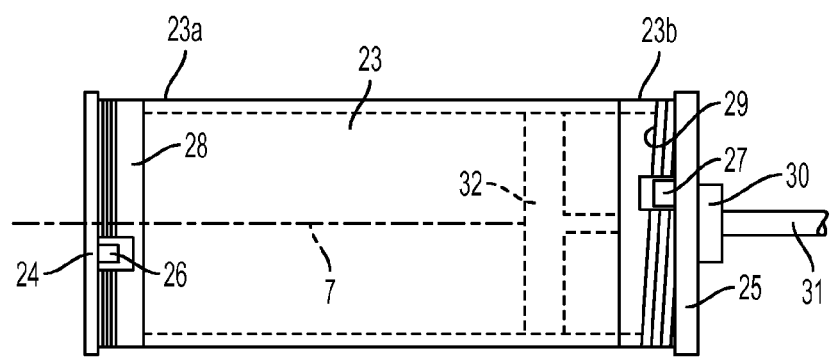
FIG. 5 an outer view of a pump cylinder housing with two assembled cover parts.

An outer view of a pump cylinder housing 23 which is closed off at each of its ends 23a, 23b with one cover part each is represented in FIG. 5. At the ends of the hollow cylinder 23, in each case, on the one hand, a union nut 24, 25 is represented, as well as, on the other hand, in each case the projections 26, 27 of continuations of the cover parts which are covered by the union nuts 24, 25 and which project into the respective grooves of the threaded sleeves 28, 29 and are held by the union nuts 24, 25, wherein these continuations are not visible in more detail.

With the cover part which lies on the right in FIG. 5, a drive lead-through 31 is provided in the middle, through which a drive rod 31 of a pump piston 32 is led in a gas-tight manner. The pump piston 32 is represented by dashed lines in the inside of the cylinder housing 23. It lies in a sealing manner against the inner surface of the cylinder housing 23 and may be moved in an oscillating manner along the symmetry axis. Respective non-central forces acting on the drive rod 31, which for example may occur due to the articulated connection to a piston drive, are accommodated by the reliable connection between the respective cover part and the cylinder housing 23.

Figure 6:
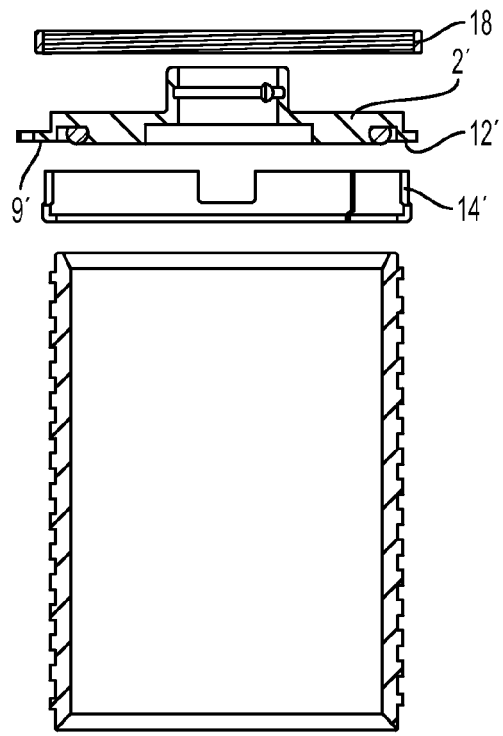
FIG. 6 a further embodiment of the cylinder housing in an exploded view.
Figure 7:
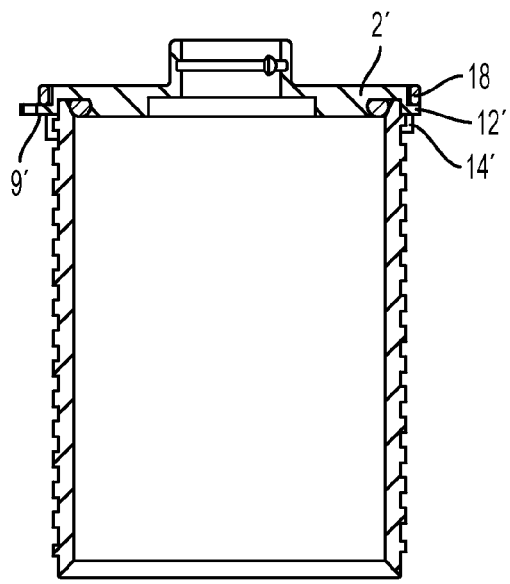

FIG. 6 shows an embodiment of the cylinder housing, with which the cover part 2' has such an outer diameter that it fits into the threaded sleeve 14'. The cylindrical cover part 2' comprises projections 9', 12' on its outer peripheral surface, which point radially outwards and extend through axial longitudinal grooves in the threaded sleeve past its outer contour. The projections are designed as segments of a revolving outer ring at the outside on the cover part, wherein the outer ring may have a rectangular cross section. The threaded sleeve 14' and the union nut 18, in the joined-together condition which is represented in FIG. 7, project axially beyond the end-side of the hollow cylinder and surround the cover part.

Figure 8:
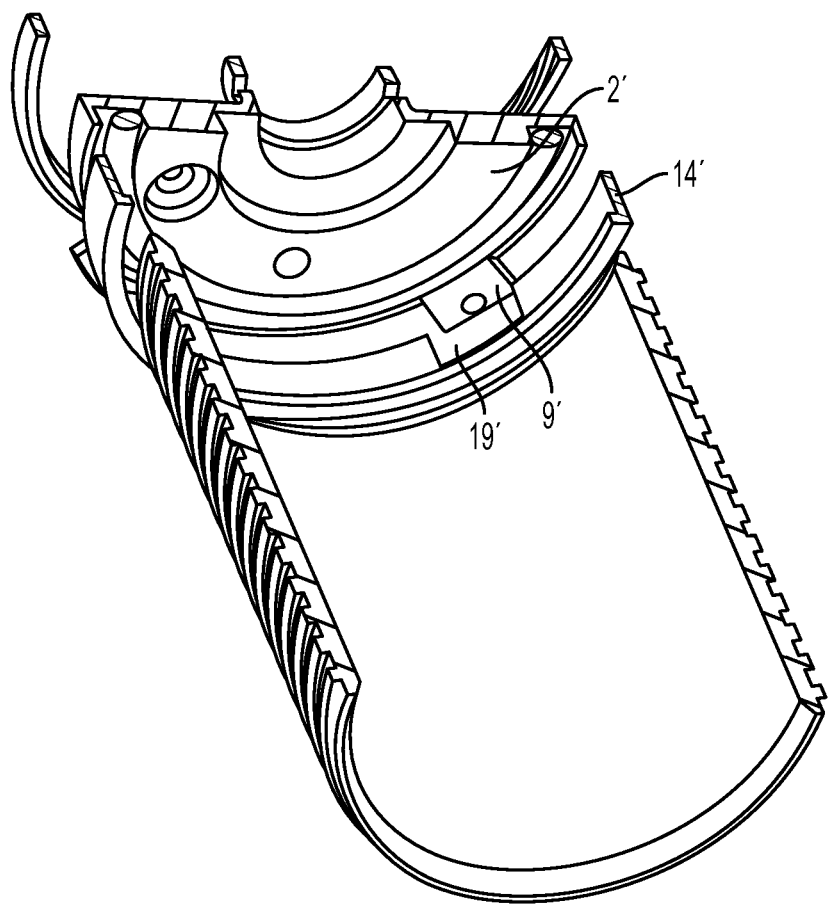
FIG. 8 the embodiment of FIGS. 6 and 7 in a three-dimensional representation.

FIG. 8 shows the constellation of FIG. 6 in a three-dimensional representation. In particular, the axially running groove 19' of the threaded sleeve 14' may be recognised, into which the projection 9' of the cover part 2' immerses.

The cylinder housing according to the invention is sealed in a permanent and reliable manner despite the simple assembly. The respective threaded sleeves, as represented in FIG. 1, may either themselves have recesses which may be snapped onto corresponding projections of the hollow cylinder, or, vice versa, a threaded sleeve may comprise radially inwardly projecting projections which may be locked into corresponding recesses of the hollow cylinder. Thereby, several such recesses/projections are advantageously provided on the periphery in order to prevent a jamming of the threaded sleeve. It may also be useful if the respective recesses/projections are not completely peripheral on the periphery of the cylinder housing and thus, by way of the positive-fit connection, a rotation of the threaded sleeve may also be prevented, so that the threaded sleeve does not co-rotate when the union nut is screwed on.

The invention claimed is:

1. A pump cylinder housing, with a hollow cylinder and with an end-side cover part, and comprising
    a threaded sleeve which may be fixed on the outside on the hollow cylinder,
    at least three projections which are connected to the cover part, are distributed on a periphery of the cover part, in each case point radially outwards and at least partly project through recesses of the threaded sleeve, as well as
    a union nut which may be screwed onto the threaded sleeve, wherein the projections project radially out of the threaded sleeve and bear on an end side of the union nut.

2. A cylinder housing according to claim 1, wherein the threaded sleeve is designed as a crown sleeve with radial tapers which, proceeding from the end on the cover part side, extend over a part of the length of the threaded sleeve.

3. A cylinder housing according to claim 1 or 2, wherein longitudinal grooves extend radially through the wall of the threaded sleeve.

4. A cylinder housing according to claim 1 or 2, wherein at least three continuations are provided on the cover part which each extend in the axial direction along the hollow cylinder and at least partly project into recesses or grooves of the threaded sleeve, wherein each of the at least three projections is a radially outwardly pointing projection and is provided on a corresponding one of the at least three continuations.

5. A cylinder housing according to claim 1 or 2, wherein the threaded sleeve is longitudinally slotted in a continuous manner.

6. A cylinder housing according to claim 1 or 2, wherein the threaded sleeve comprises at least one radially inwardly projecting projection which engages in a recess or undercut on the outer side of the hollow cylinder for fixing the threaded sleeve in the axial direction.

7. A cylinder housing according to claim 6, wherein the threaded sleeve comprises several projections which are distributed annularly on its inner peripheral surface and which engage into corresponding recesses or undercuts on the outer side of the hollow cylinder.

8. A cylinder housing according to claim 1 or 2, wherein the hollow cylinder on its outer peripheral surface comprises at least one projection which cooperates with a recess or undercut on the inner side of the threaded sleeve for its axial fixation.

9. A cylinder housing according to claim 1 or 2, wherein the hollow cylinder at its end-side comprises a cone which cooperates with the cover part.

10. A cylinder housing according to claim 9, wherein the cone of the hollow cylinder cooperates with the cover part by an intermediate sealing ring layer.

11. A cylinder housing according to claim 10, wherein the sealing ring consists of an elastomer.

12. A cylinder housing according to claim 1 or 2, wherein a cover part is provided on each end-side of the hollow cylinder.

13. A cylinder housing according to claim 1 or 2, wherein a cover part comprises a drive lead-through for a drive rod of a pump piston.

* * * * *